June 1, 1937.  F. K. BROWN  2,082,748
COMBINED SOCKET AND SLOTTED SCREW
Filed Dec. 15, 1936
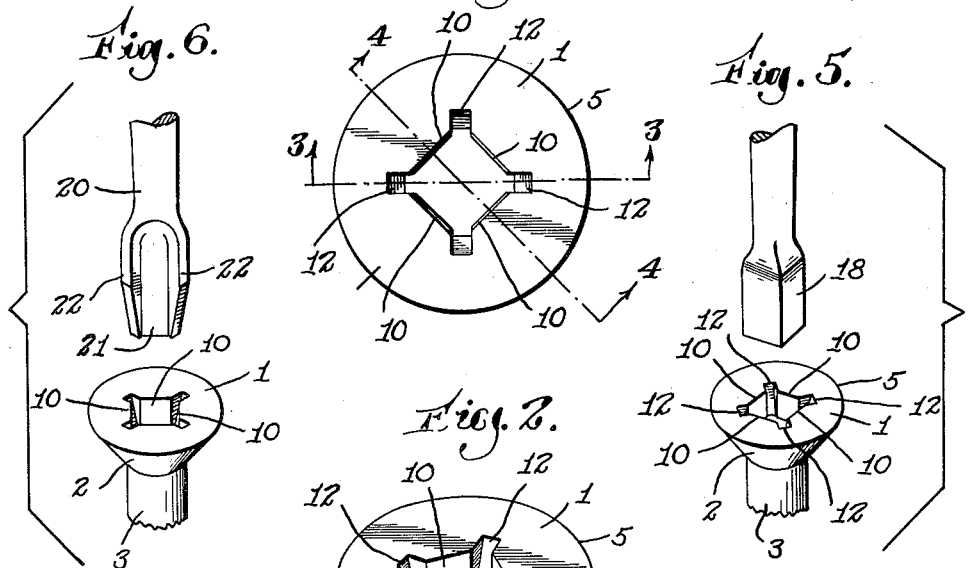
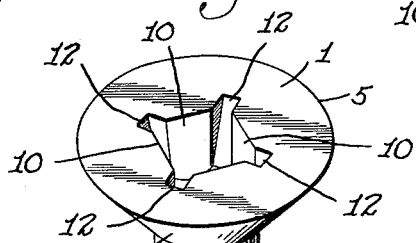
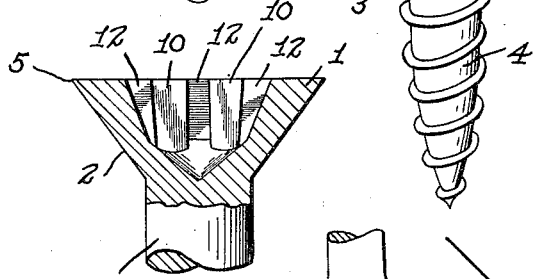
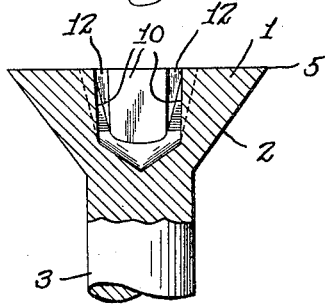
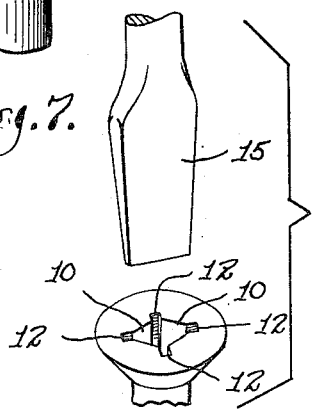
Inventor
Frank K. Brown
by James R. Hodder
attorney Patented June 1, 1937

2,082,748

UNITED STATES PATENT OFFICE 2,082,748

COMBINED SOCKET AND SLOTTED SCREW

Frank K. Brown, South Dartmouth, Mass., assignor to Continental Screw Company, New Bedford, Mass., a corporation of Massachusetts Application December 15, 1936, Serial No. 115,935

2 Claims. (Cl. 85—45)

My present invention is an improved screw structure and process of making same, wherein I have combined the features of a socket and a slot, or plurality of slots, for the use of both a common screw driver and a special screw driver.

In the manufacture of the present types of screws for use on wood, or as machine screws, cap screws, drive screws, or as bolts for use with threaded nuts it is important that the same be made by the usual automatic machines and economical methods of the present practice, and also that the heads having slots or recesses to turn the screws be capable of similar economical manufacture.

In the making of the usual type of screws it is customary to have the head subjected to a saw cut to remove the material and make a slot to receive the standard type of screw driver. Also it is customary in the forming of socket recesses in a screw head to swedge the recess by one or more punching or heading actions, it being impractical to form such recesses by castings because of the expense involved.

It is an important object of my present invention to so form and construct the screw head as to combine both a socket and a plurality of slots, which slots will not be formed by saw cuts and hence the entire socket and slot operation will be effected by present types of high-speed automatic machinery and by one or more swedging actions.

Thus by my present invention I am enabled to produce in an economical and practical manner a combined socket and slot headed screw wherein the slots, to receive the ordinary screw driver when desired, will be entirely contained within the periphery of the head and thus no material is removed from the head of the screw, but the entire mass of metal in the screw head is, in effect, forged into the rim and body of the screw during the swedging action.

While I am aware that various designs of sockets have heretofore been employed in screw manufacture, the same have been of square, triangular, or polygonal contour and either with or without specially curved or angled facets for the sides of the socket at particularly bevelled angles, all of which required specially formed screw-driving instrumentalities. But in my present design I form a straight-sided socket recess in combination with a plurality of slots so as to permit either a common screw driver or an ordinary socket wrench to be employed which is, I believe, distinctly new in this art.

It is also novel, so far as I am at present advised, to form slots in the screw head by a swedging action simultaneously with the formation of a socket and by means of the same tools as a simultaneous operation.

These features above briefly outlined I wish to claim herein broadly.

Additional novel features and advantages will be more fully pointed out, described, and claimed.

Referring to the drawing illustrating the preferred form of my invention,

Fig. 1 is a plan view of a standard type of flat head wood screw;

Fig. 2 is a prospective of the same;

Fig. 3 is a fragmentary cross-sectional view on the line 3—3 of Fig. 1;

Fig. 4 is a fragmentary cross-sectional view on the line 4—4 of Fig. 1;

Fig. 5 illustrates my improved screw with a socket wrench to fit the socket and turn the screw;

Fig. 6 is a view showing a winged type of screw-driver which can also be utilized to operate my novel type of screw, and Fig. 7 illustrates a standard type of screw-driver to operate the screw by engagement of the slots.

It will be appreciated that the manufacture of socket headed screws by swedging or heading machines tends to strengthen the metal in the head by the hammering or forging action of such machines.

By my novel design of a combined socket and slot with the slots ending within the periphery of the screw head, the strength of the metal in the head is thus maintained by having the rim or periphery of the head intact and is not weakened as in prior methods of slotting the head entirely across by a saw cut. While I may form the combined socket and slots of varying sizes, extending the slotted portions either relatively close to the periphery or rim of the head, and may vary the relative proportions of the square socket recess and the extent of the slot portions, yet I have shown in the drawing a commercially satisfactory proportion between the size of the screw head and the area of the socket and slots, as well as illustrating a suitable depth of the socket and slots in the screw head so as to leave sufficient metal both in the rim and in the shank to insure great strength for my improved screw head.

Also it will be appreciated that I may form such combined socket and slot construction in other types of screw heads, such as round, half-round, as well as flat, and with peripheries other than round if desired, the essential feature being my combined socket and slotted construction with the slots to receive a common screwdriver opening from the central socket and, preferably, from the corner portions of the socket as shown.

While an ordinary screwdriver such as illustrated in Fig. 7 can well be employed in my novel screw, or a plain socket wrench as illustrated in Fig. 5, yet I may also utilize a combined socket and winged driver such as shown in Fig. 6, wherein the benefit of both the engagement of the socket wrench like Fig. 5 and the wings to engage the sides are obtained in the screw-driving action.

Referring to the drawing, 1 designates the top or head of the standard type of screw having a bevelled face 2 extending downwardly for the thickness of the head and united to the shank 3, having a screw threaded portion 4 which may be for a wood screw, machine screw, bolt or nut. In the head 1 and within the periphery of the rim 5, so as to leave the rim 5 unbroken, I form my combined socket and slot recess. For this purpose a suitable swedging tool or tools are utilized in the standard type of automatic machines in use for such operations, and formed directly in the head is a recess combining the socket portion with the square sides 10—10 extending substantially vertically into the screw head and the slotted portions 12—12 opening from the square recess and arranged diagonally or from the corners of the square socket. This combined socket and slot construction is effected by one or more swedging actions, preferably as a cold heading operation, and the heading blank thus formed is thus subjected to the threading and finishing operations.

With my completed combined socket and slotted structure the screw can be manipulated either by an ordinary screwdriver, as shown at 15, which would engage the slots 12—12 spanning the square socket opening or by a standard socket wrench 18, having a squared section to fit the squared recess and engage the sides 10—10 independently of the slots 12, or by a combined winged socket driver, as shown in Fig. 6 at 20, having a squared portion 21 to engage the walls of the socket and wings 22 to engage the slot recesses 12—12.

In this type of driver preferably four wings 22 would be formed thereon to engage all the four walls 12—12, as well as the walls of the square socket, thus giving a very firm, strong, and rigid contact between the driving element 20 and the screw head.

My novel and improved screw structure and the method of forming both a socket and a slot, or plurality of slots, by a simultaneous and a heading action independently of saw-cutting the slot portions are of great importance, eliminating the former weakness in the saw-cut slot of cutting thru the rim and removing the metal from the head. Also the facility of utilizing either a wrench or common screwdriver or a special winged driver to engage the plurality of slots and also the square sides or faces of the socket, thus giving a firm contact, is highly important and desirable in a structure of a screw, bolt, rivet, or the like.

I claim:

1. A screw having its head formed with a socket rectangular in cross-section and with the side walls substantially parallel with the axis of the screw and with each other, together with a plurality of pairs of slots, each pair being in diametrical alignment, opening from the walls of said socket and rectangular in cross-section, said slots extending beyond the walls of said socket and terminating within the periphery of the screw head.

2. A screw having its head formed with a socket rectangular in cross-section and with the side walls substantially parallel with the axis of the screw and with each other, together with a plurality of slots one opening from each corner of said socket, each slot being rectangular in cross section extending beyond each corner of the socket, and terminating within the periphery of the screw head.

FRANK K. BROWN.